United States Patent Office 3,080,183
Patented Mar. 5, 1963

3,080,183
JOINTS FOR USE IN SCIENTIFIC
GLASS APPARATUS
Paul R. Luertzing and Walter O. Luertzing, Vineland, N.J., assignors to Lurex Manufacturing Company, Vineland, N.J., a corporation of New Jersey
Filed Feb. 18, 1959, Ser. No. 794,051
11 Claims. (Cl. 285—332.3)

This invention relates to scientific glass apparatus, such as is used in chemical laboratories, and is concerned more particularly with novel joints for use in glassware for chemical or physical purposes and of either the fixed or movable types. The invention also includes a method by which the new joints may be advantageously made.

Scientific glass apparatus is commonly assembled of a number of glass elements connected together by joints which can be put together and taken apart. In one form, such a joint includes an inner member and an outer member which have surfaces ground with a mating taper, so that the joint is tight and may be employed in apparatus suitable for pressure or vacuum operation. Glass stoppers, either solid or hollow, which are used in scientific apparatus, also have a ground frusto-conical surface adapted to make a tight fit in and form a tapered joint with an outer member provided with an internal ground surface of similar taper, and stop-cocks commonly include an outer member with an interior ground tapered surface and a plug having a ground external surface of mating taper, the member and plug forming a movable joint.

While tapered grround joints as above described are those most widely used in scientific apparatus, it is common knowledge that such joints frequently become stuck or frozen, so that it is difficult to dismantle the apparatus and attempts to take the joints apart result in breakage with possible loss of the experiment for which the apparatus was used, and injury to the technician. Such sticking of joints is usually caused by solid or vaporizable substances from the interior of the apparatus becoming embedded in the ground mating surfaces or by differential expansion of the members making up the joint and, to overcome the sticking, many kinds of lubricating materials for application to the ground surfaces have been developed. However, in apparatus employed for many purposes, the use of lubricants is undesirable, since the lubricating material may enter the apparatus and contaminate the experiment being carried on.

The present invention is accordingly directed to the provision of tight tapered glass joints of the fixed and movable types, which are not subject to freezing or sticking and are thus not subject to the disadvantages of similar joints as now constructed. The new joints used for assembling elements of apparatus facilitate both the erection and dismantling of the apparatus and they may also be employed in both stoppers and stop-cocks. In the new joints, the desired results are obtained by the application to the tapered surface of the inner member of the joint of a sleeve or covering of a non-sticking non-volatile material which co-operates with the mating surface of the outer member to form a tight seal. The material employed is impervious to the action of corrosive compounds and highly resistant to most organic solvents, and soluble or vaporizable substances do not adhere to it. Also, the material is somewhat resilient so that the outer surface of the sleeve will conform to the surface of the outer member to provide the desired seal.

For a better understanding of the invention, reference may be made to the accompanying drawing, in which.

Figure 1:
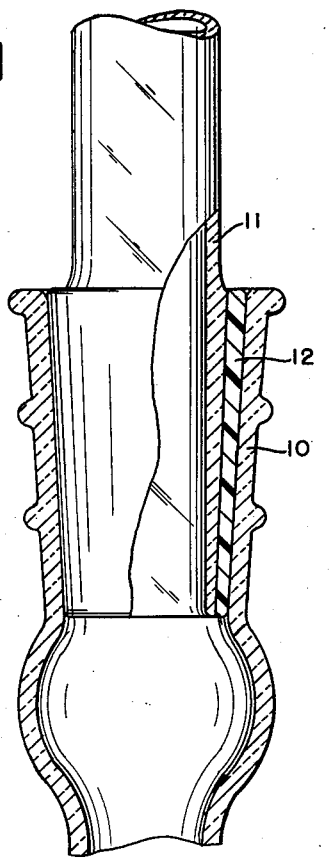
FIG. 1 is a view, partly in longitudinal section and partly in elevation, of a typical tapered joint embodying the invention.
Figure 2:
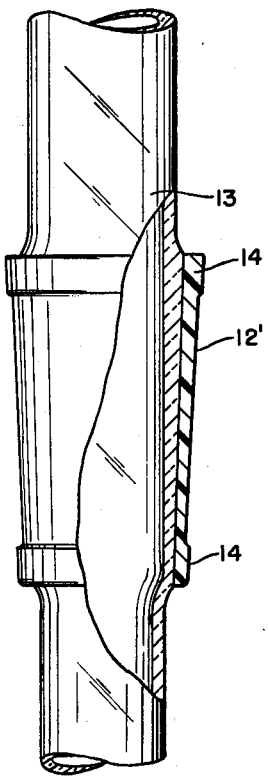
FIG. 2 is a longitudinal sectional view of a modified form of the inner member of a joint of the invention.

The tapered glass joint shown in FIG. 1 includes an outer member 10 and an inner member 11, both of which are tubular and have end sections adapted to fit one within the other and formed with surfaces of corresponding taper. In prior joints, the mating surfaces are ground, until the surfaces have an approximately perfect fit and thus make a tight seal.

In the joint of the invention, the tapered surface on the inner member is formed of a sleeve 12 made of a material, which is non-volatile and non-sticking, resists attack by most chemical compounds including organic solvents, is tough and wear-resistant, and is capable of being expanded on heating and shrinks after expansion to substantially its original dimensions. The preferred material for the purpose is the synthetic tetrafluoroethylene resin sold commercially under the trademark "Teflon" and the trifluorochloroethylene resin sold under the trademark "Kel-F" may also be used. The "Teflon" resin can be easily machined to shape, size, and taper and, if increased resistance to wear and distortion as a result of cold flow are desired, a form of the resin impregnated with glass may be employed. A 15% impregnation with glass will give the resin a wear-resistance several hundred times that of the unimpregnated resin and will not impair the other qualities of the resin. The "Kel-F" resin is the harder of the two resins and is preferred where a tougher material is required.

In the formation of a joint containing the sleeve 12, the outer member 10 is made in the usual way with an internal surface which is shaped and ground to the desired taper. In making the inner member 11 of an ordinary joint, its external surface is shaped and ground with a taper such that the surfaces on the two members will mate with a substantially perfect fit. However, in forming the inner member of the new joint, its dimensions must be such that, when the sleeve is in place, the inner member and sleeve will enter the outer member and make a tight fit. Accordingly, in the new joint, the external surface of the inner member has a taper complementary to that of the internal surface of the outer member but the diameter of the external surface in any transverse plane is smaller by twice the desired wall thickness of the sleeve than the diameter of the internal surface in the same plane. Also, the external surface need not be so carefully finished as that in an ordinary joint, and rough grinding is sufficient and actually preferred, since the sleeve stays in position better on a somewhat rough surface.

The sleeve 12 is of substantial thickness so that it is self-supporting and sufficiently rigid to be easily handled, and the wall thickness preferably ranges from 1 mm. to 3 mm., although these dimensions may be varied, so long as the sleeve can stand alone without collapsing. In making the sleeve, the starting material is tubing of the selected resin, and a piece of tubing of the proper length is bored to give it an internal surface, which is preferably of the same taper as that of the external surface of the inner member 11. The diameter of the internal surface of the piece of tubing in any transverse plane is less than that of the external surface of the inner member in the same plane, so that the piece of tubing, when cold, cannot be slipped over the external surface of the inner member to cover that surface. If desired, the piece of tubing may be bored to give it an internal cylindrical surface of a diameter slightly less than the smallest diameter of the external surface of the inner member but it is difficult to mount such a sleeve on the inner member. The sleeve is completed by finishing its external surface by machining and grinding to a size and taper, such that it will make the proper tight fit in the internal surface of the outer member of the joint.

To mount the sleeve in place on the inner member of the joint, the sleeve is slipped over the small end of the inner member as far as it will go and the member with the sleeve in place is then heated in an oven to allow the sleeve to stretch sufficiently to permit the sleeve to be moved into place to cover the external surface of the member. Heating of the assembly to from 250° F. to 300° F. is ordinarily sufficient for the purpose and, when the assembly has reached the desired temperature, it is removed from the oven and the sleeve, while still hot, is slid along the external surface to cover the latter. Upon cooling of the assembly, the sleeve tends to return to its original size and makes a frictional bond with the external surface. In its cool condition, the sleeve will also make a frictional bond with the internal surface of the outer member of the joint.

Although a sleeve made of the resin materials mentioned above is non-sticking, it has been found desirable in many instances to make the surface, with which the sleeve contacts, smoother than is attainable by fine grinding. For this purpose, the mating surface may be finished by the usual fine grinding, after which the surface is either polished or given a coating of a glaze composition as disclosed in the patent to Geyer et al. 2,169,194, issued August 8, 1939.

For some purposes, it is possible to make use in the new joint of an outer member with an internal surface, which is shaped to the desired dimensions and taper but not ground. With an outer member having such an unground surface, the inner member 13 is made as above described and it carries a sleeve 12' of modified form. The sleeve 12' is made in the same way and of the same materials as the sleeve 12 but, instead of having an outer surface of a taper complementary to that of the internal surface of the outer member of the joint, the sleeve 12' is provided with two or more circumferential bands or enlargements 14, 14 projecting outwardly and preferably having external tapered surfaces adapted to engage the internal surface of the outer member with a tight fit. As the bands are relatively narrow, they are sufficiently deformable so that they can conform to minute irregularities in the mating surface and make a seal, which is tight against either vacuum or pressure.

Figure 3:
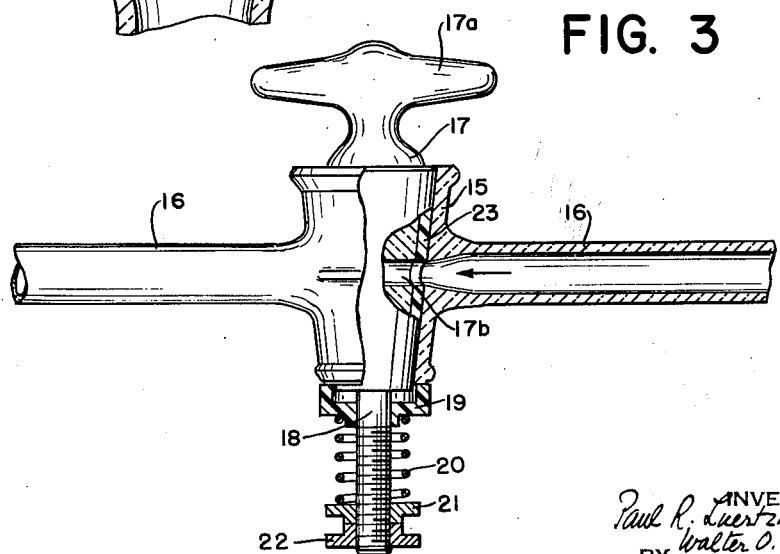
FIG. 3 is a view, partly in longitudinal section and partly in elevation, of a stop-cock constructed in accordance with the invention.

The stopcock shown in FIG. 3 is a typical form of movable joint embodying the invention and it includes an outer member or barrel 15 having an internal tapered surface and tubular extensions 16 forming a passage with openings at the surface. The inner movable member of the joint is the plug 17 with the handle 17a at its large end and the stem 18 embedded in its small end and projecting out of the barrel. The stem extends through a cap 19, which bears on the end of the barrel and encloses the end of the plug projecting from the barrel. A spring 20 seated at one end on the cap and at the other against a nut 21 threaded on the stem tends to hold the plug with its outer surface in contact with the inner surface of the barrel. A second nut 22 on the stem locks nut 21 in place.

The plug is provided with a sleeve 23 of one of the resin materials described, and the sleeve is shrunk on the plug and has an outer surface of a taper complementary to that of the inner surface of the barrel. The plug has a diametrical passage 17b for connecting the extensions 16 and the sleeve has openings at the ends of the passage 17b. The barrel and the plug are made and the sleeve is applied by the operations above described. In a stopcock, it is desirable to have the internal surface of the barrel smoother than is attainable by fine grinding and, for this purpose, the surface is finished by fine grinding and then either polished or provided with the glaze coating described in Patent 2,169,194.

In all forms of the new joint, the use of the sleeve of the non-sticking inert resin material overcomes the objections to ground joints as now made and the new joints may be easily put together and taken apart. Also, a stopcock with the new joint does not stick and can be operated easily and smoothly. As the resin sleeve is frictionally bonded in place, it grips the inner member of the joint tightly and will not slip. If, in the course of time, the sleeve becomes worn, it can be removed by heating the inner member and sleeve to permit the sleeve to expand, whereupon the sleeve can be easily slid along the inner member. A new sleeve can then be slipped over the end of the inner member and, after being heated, can be moved to final position.

We claim:

1. A joint, which comprises an outer glass member having an internal surface of revolution, at least a portion of which tapers in diameter from one end to the other, an inner glass member having an external surface of revolution, the inner member having an external surface portion tapering in diameter from one end to the other, the inner member lying within the internal surface of the outer member with the surfaces of the two members opposed, and a rigid, self-supporting, peripherally-continuous sleeve of a tough, non-sticking, non-volatile, synthetic resinous material resistant to wear and corrosion, having properties generally similar to tetrafluoroethylene and having a thickness of not less than about 1 mm., said sleeve being frictionally bonded onto said tapering surface of the inner member to enclose a substantial portion thereof, the tapering surface of the sleeve having at least one continuous frictional area engaging and forming a seal with the internal surface of the outer member, the taper of said tapering portion of the inner member being sufficiently slight that when said sleeve is frictionally bonded thereon it is mechanically held thereto and will not slip off either end thereof by any normal forces to which it is subjected in use.

2. The joint of claim 1, in which the sleeve has external surface of revolution of a taper complementary to that of the internal surface of the outer member.

3. The joint of claim 1, in which the external surface on the inner member is tapered from end to end.

4. The joint of claim 3, in which the tapers of the surfaces on the members are approximately the same.

5. The joint of claim 1, in which the internal surface of the outer member is smoother than is attainable by fine grinding.

6. The joint of claim 1, in which the internal surface of the outer member is less smooth than is attainable by fine grinding and the sleeve is provided with at least two spaced outwardly projecting circumferential bands engaging the internal surface of the outer member.

7. The joint of claim 1, in which the sleeve is made of a material from the class consisting of tetrafluoroethylene and trifluorochloroethylene.

8. For use in a joint of the tapered male and female type, an inner glass member having an external surface of revolution, said inner member having an external surface portion tapering in diameter from one end to the other, and a rigid, self-supporting, peripherally continuous sleeve of a tough, non-sticking, non-volatile synthetic resinous material resistant to wear and corrosion, having properties generally similar to tetrafluoroethylene and having a thickness of not less than about 1 mm., said sheet being frictionally bonded onto said tapering surface to enclose a substantial portion thereof, the taper of said tapering surface portion being sufficiently slight that when the sleeve is frictionally bonded thereon it is mechanically held thereto and will not slip off either end thereof by any normal forces to which it is subjected in use.

9. The inner member of claim 8, in which the external surface of the sleeve tapers from one end to the other.

10. The inner member of claim 8, in which the sleeve is formed with spaced circumferential outwardly projecting bands.

11. The inner member of claim 8, in which the sleeve is made of a material of the class consisting of tetrafluoroethylene and trifluorochloroethylene.

References Cited in the file of this patent

UNITED STATES PATENTS

| | | |
|---|---|---|
| 1,811,067 | Valle | June 23, 1931 |
| 1,918,171 | Barrett | July 11, 1933 |
| 1,919,455 | Wilson | July 25, 1933 |
| 1,998,356 | Brown | Apr. 16, 1935 |
| 2,083,228 | Geyer | June 8, 1937 |
| 2,097,571 | Moran | Nov. 2, 1937 |
| 2,169,194 | Geyer | Aug. 8, 1939 |
| 2,412,487 | Amley | Dec. 10, 1946 |
| 2,543,154 | Cox | Feb. 27, 1951 |
| 2,622,949 | Cotchett | Dec. 23, 1952 |
| 2,671,899 | Vickery | Mar. 9, 1954 |
| 2,946,606 | Smith | July 26, 1960 |

FOREIGN PATENTS

| | | |
|---|---|---|
| 278,090 | Switzerland | Jan. 3, 1952 |
| 770,774 | Great Britain | Mar. 27, 1957 |
| 799,162 | Great Britain | Aug. 6, 1958 |